No. 732,611. PATENTED JUNE 30, 1903.
C. H. AYARS.
CAN SOLDERING MACHINE.
APPLICATION FILED MAY 31, 1902.
NO MODEL. 3 SHEETS—SHEET 1.

Witnesses
N. F. Meyer, Jr.
Charles L. Vietsch.

Inventor.
Charles H. Ayars
By Mann & Co,
Attorneys.

No. 732,611. PATENTED JUNE 30, 1903.
C. H. AYARS.
CAN SOLDERING MACHINE.
APPLICATION FILED MAY 31, 1902.
NO MODEL. 3 SHEETS—SHEET 2.

Witnesses.
Inventor.
Charles H. Ayars
By Mann & Co,
Attorneys.

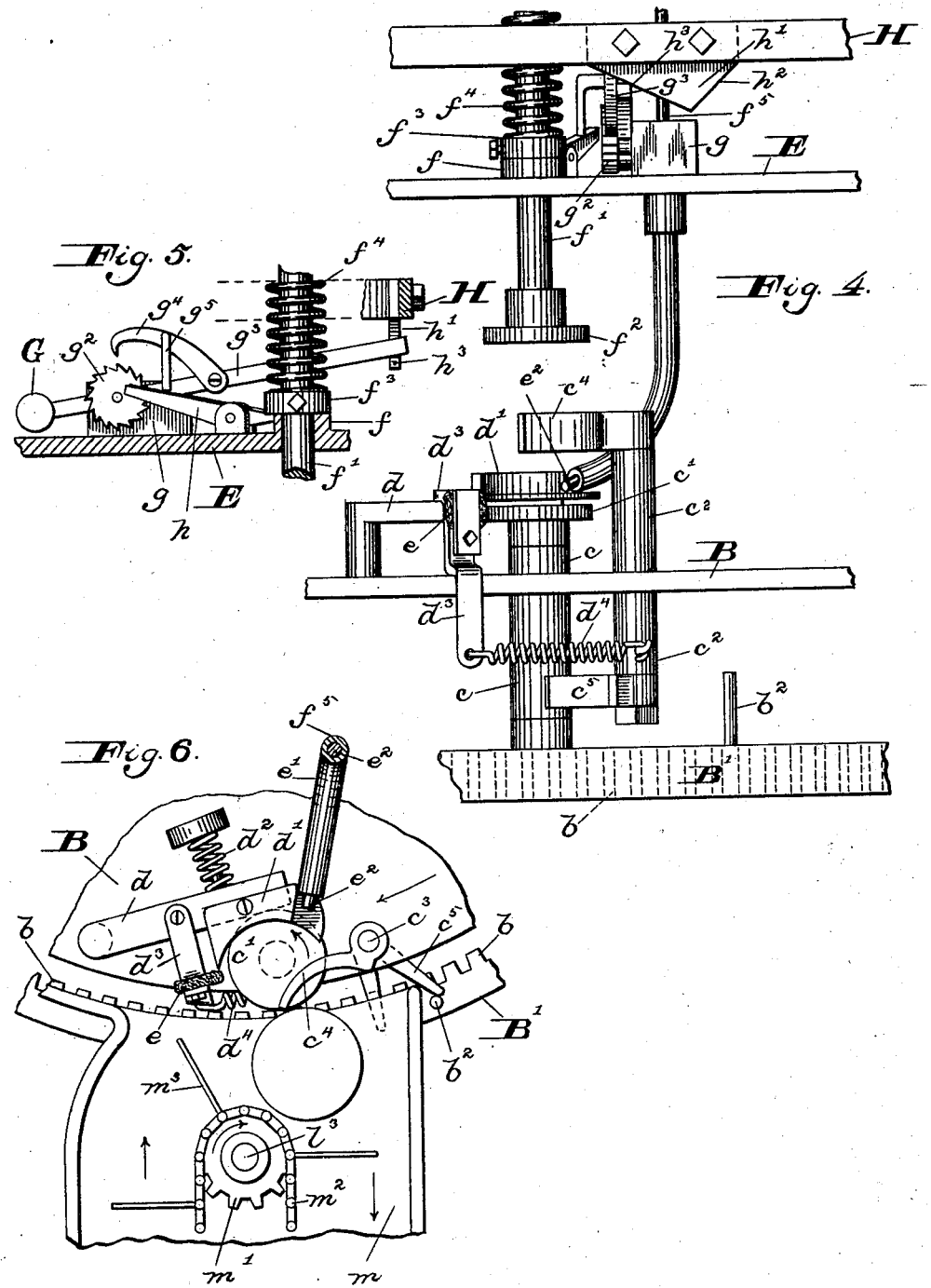

No. 732,611. Patented June 30, 1903.

UNITED STATES PATENT OFFICE.

CHARLES H. AYARS, OF SALEM, NEW JERSEY, ASSIGNOR TO AYARS MACHINE COMPANY, A CORPORATION OF NEW JERSEY.

CAN-SOLDERING MACHINE.

SPECIFICATION forming part of Letters Patent No. 732,611, dated June 30, 1903.

Application filed May 31, 1902. Serial No. 109,683. (No model.)

*To all whom it may concern:*

Be it known that I, CHARLES H. AYARS, a citizen of the United States, residing at Salem, in the county of Salem and State of New Jersey, have invented certain new and useful Improvements in Can-Soldering Machines, of which the following is a specification.

This invention relates to improvements in machines for soldering the heads and bottoms on sheet-metal cans.

Some of the objects of the invention are, first, to provide improved means for carrying and revolving the can-bodies during the soldering operation; second, to provide improved soldering devices; third, to provide improved solder-feed devices; fourth, means for wiping the surplus solder from the bodies; fifth, improved devices for ejecting the soldered bodies, and other objects pointed out in the specification and claims.

The invention is illustrated in the accompanying drawings, in which—

Figure 1:
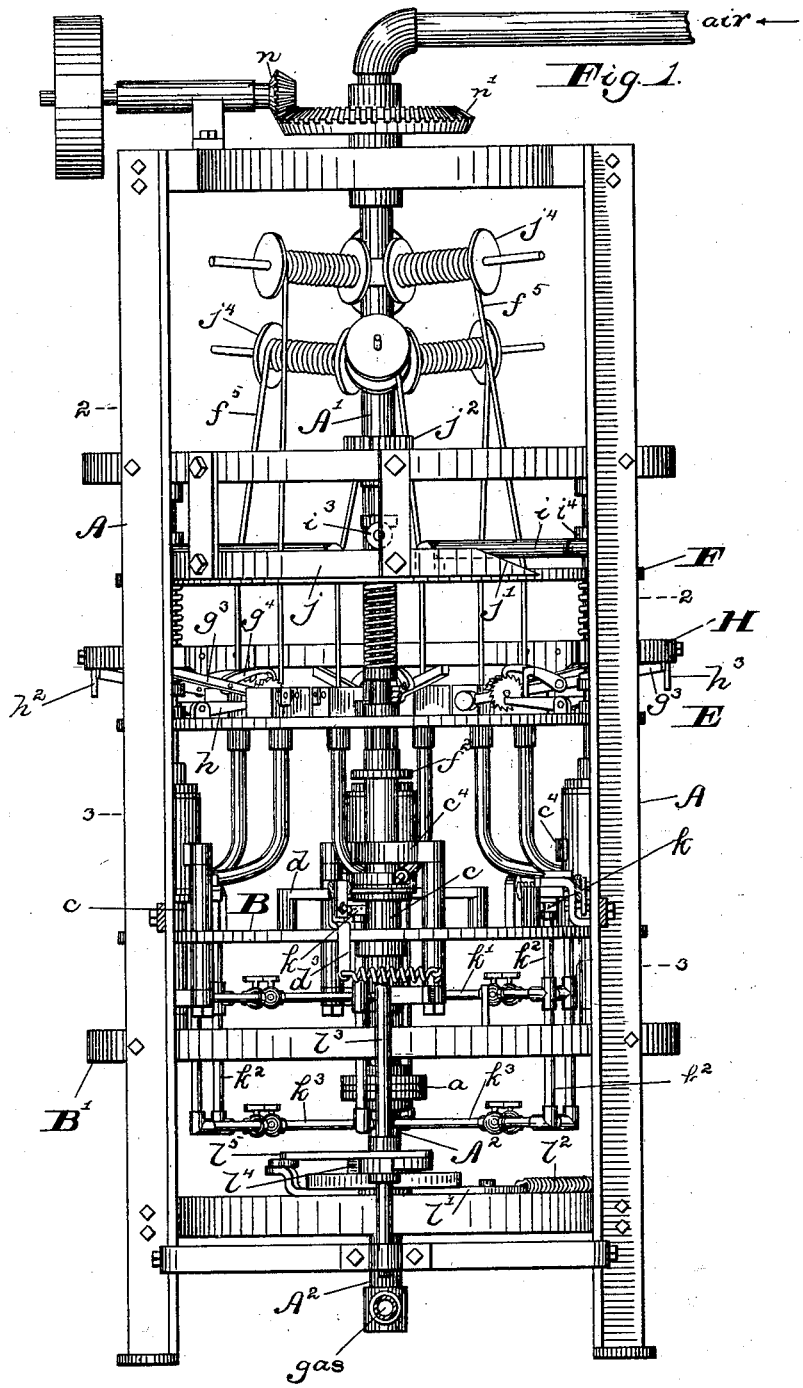
Figure 2:
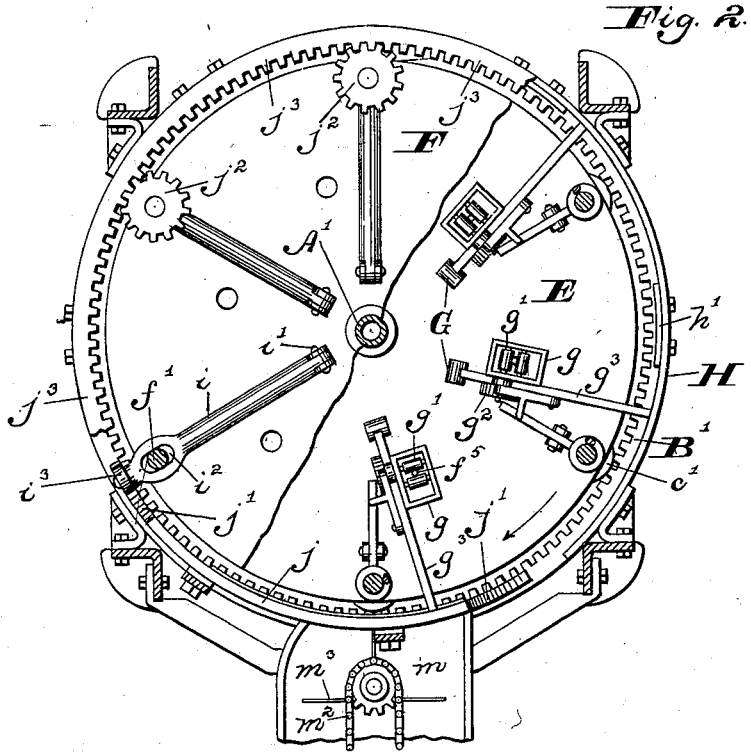
Figure 3:
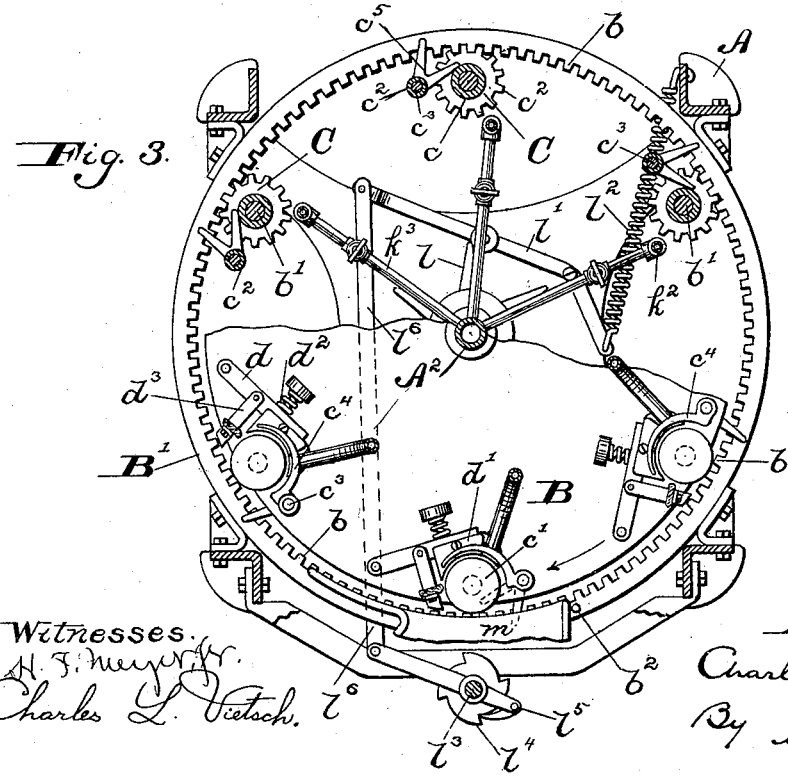

Figure 1 is a side elevation of the machine. Fig. 2 is a cross-section on the line 2 2 of Fig. 1. Fig. 3 is a cross-section on the line 3 3 of Fig. 1. Fig. 4 is a detail in side elevation, on a large scale, showing the can-carrier, the soldering-iron, the wiper, solder-feed device, and the ejector. Fig. 5 is a detail side elevation of the solder-feed device. Fig. 6 is a plan view, on a large scale, of the soldering-iron, wiper, and ejector.

In the drawings, A designates a framework of any suitable construction, which in the present instance comprises four vertical posts connected at the top and bottom by suitable plates. A hollow shaft A' extends vertically through the center of the frame and is closed at its lower end by a coupling-plate $a$, and a second hollow shaft $A^2$ extends from said coupling-plate to the bottom of the machine.

Secured to the shaft A' and revolving therewith is a horizontal plate B, and below said plate and supported by the frame is a stationary ring B', provided on its inner side with a rack $b$. The plate B is provided with a plurality of sleeves $c$, in the present instance six in number, which are preferably cast integral therewith, and said sleeves project in a vertical direction both above and below said plate and form a bearing. A vertical shaft $b'$ extends through each of the said sleeve-bearings $c$, and at the upper end each shaft carries a head $c'$, while the lower end is provided with a pinion C, which meshes with the circular rack $b$, and as the plate B is revolved, carrying the shafts $b'$ with it, the several pinions C by engaging the stationary ring-rack causes the shafts and heads $c'$ to revolve. The plate B is also provided with a plurality of vertical sleeves $c^2$, which also extend above and below said plate, and these latter sleeves form a bearing for a vertical rod $c^3$, each of which carry at their upper ends a curved arm $c^4$, and at their lower ends said rods are provided with a pronged arm $c^5$. Each of these vertical rods $c^3$ have position near one of the heads $c'$ and are carried by the revolving plate B. A stationary pin $b^2$ projects upward from the rack $b$ and engages one of the pronged arms $c^5$ on each of the rods $c^3$ as each one approaches during the revolution of the plate B, as clearly shown in Fig. 6, and by giving the rod $c^3$ a partial rotary movement swings the arm $c^4$ out over the rack $b$. The other prong $c^5$ takes against the sleeve-bearing $c$ and serves as a stop to prevent the curved arm $c^4$ from swinging inwardly too far. The revoluble plate B also carries a plurality of pivoted soldering-irons $d'$, each of which is attached to an arm $d$, in the present instance six in number. Each soldering-iron $d'$ is pivoted to its arm in order that each iron may have a movement in a horizontal plane independent of its carrying-arm, and each soldering-iron swings in a horizontal plane just above one of the revoluble heads $c'$. A spring $d^2$ serves to keep the arms $d$ and soldering-irons $d'$ pressed outward, as seen in Fig. 6. A horizontal arm $d^3$ is pivoted at one end to said carrying-arm $d$ and projects laterally from said arm $d$ toward the edge of the plate B and is then bent downwardly over and below said plate, and a spiral spring $d^4$ connects the lower end of said arm $d^3$ and one of the sleeves $c^2$, and the spring serves to draw the arm $d^3$ toward the head $c'$. A piece of asbestos $e$ or other suitable wiping material is secured or clamped to each pivoted arm $d^3$ and serves as a wiper to wipe the surplus molten solder from the seam of the can as the same revolves on the heads $c'$.

It is to be understood that the plate B in the present instance carries six revolving heads, soldering-irons, wipers, and mechanism for operating the same, but that this number may be either increased or decreased, as desired.

An upper circular plate E is also secured to and revolves with the shaft $A'$ and is provided with a plurality of bosses $f$, which have central openings, and said bosses have a position in a direct vertical line above the center of the heads $c'$ on the lower plate B, and each of these bosses serve as bearings for a vertical shaft $f'$, which latter projects through said central openings, and each carries on its lower end a head $f^2$, which is to press on top of the can. The shafts $f'$ project above as well as below said plate E, and just above each of said bosses each shaft is provided with a collar $f^3$, and above said collars each shaft is surrounded with a spiral spring $f^4$, which is compressed between said collar and a circular plate F immediately above. The plate E also carries a number of solder-feed devices, by means of which wire-solder $f^5$ is fed intermittently through a tube extending from the bottom of the plate and directed to a point at the side of the soldering-irons $d'$ and adjacent the head $c'$. This solder-feed mechanism will now be described, reference being had particularly to Figs. 2, 4, and 5.

A small rectangular frame $g$ is preferably cast integral with the plate E, and said frame carries two rollers, (see Fig. 2,) and one of said rollers $g'$ is mounted on a shaft which projects through the side of the frame $g$, and on the outside of said frame this shaft is provided with a ratchet-wheel $g^2$. A lever $g^3$ is also mounted on said shaft between the ratchet-wheel $g^2$ and the frame $g$, and the inner end of said lever is provided with a weight G, while the outer end projects upwardly in an inclined direction and extends beyond the edge of the plate E. The weighted lever $g^3$ is provided about midway between its ends with a pawl $g^4$, which takes over and engages the ratchet-wheel $g^2$, and said pawl carries a downwardly-projecting arm $g^5$. A lever $h$ is pivoted between its ends to the plate E, and its inner end projects beneath the arm $g^5$ of the pawl, and its outer end takes beneath the collar $f^3$, for a purpose which will be later described. One of the strands of wire-solder $f^5$ passes downwardly from a suitable solder-reel above between the rollers and through an opening in the plate E, and the tube directs the wire-solder to the soldering-iron $d'$. The wire-solder is fed intermittently at given points during the revolution of the machine. In the present instance each strand of wire-solder is fed at four different points by mechanism which will now be described.

A stationary ring H is secured within the frame of the machine between the plates E and F, and said ring is provided at intervals around its circumference with cam-plates $h'$, which incline from said ring downwardly in the path of travel of the outer ends of the levers $g^3$. (See Figs. 1, 4, and 5.) As the plate E revolves, carrying the levers $g^3$ with it, the upper outer ends of the latter contact first with the inclined face $h^2$ of the stationary cam-plates, which causes the outer end of the lever $g^3$ to be depressed, and this depression causes the pawl $g^4$ to make a sweeping movement over the ratchet-wheel $g^2$ and partially revolve the same. This partial revolution of the ratchet-wheel imparts a like motion to the roller $g'$, and thereby the wire-solder, which is clamped between the two rollers, is drawn downwardly a short distance. As the end of the lever $g^3$ passes over the face $h^2$ of the cam and contacts with the reversely-inclined face $h^3$, the weight on the opposite end of said lever raises the forward end thereof and causes the pawl $g^4$ to return to its former position over the ratchet-wheel. This operation of drawing the wire-solder is repeated at each of the four cam-plates, and wire solder is thereby fed downwardly through each solder-tube by four intermittent movements in each revolution of the plates B E.

In the operation of the machine it sometimes happens that a can-body is not fed into the machine between the two heads $c'$ and $f^2$ as the same move in a horizontal plane around the shaft $A'$, and at such times it is desirable that the solder should not be fed in order to avoid wasting the solder. To prevent the solder from feeding, means is provided whereby the pawl $g^4$ will be raised from engagement with the ratchet-wheel, and thereby avoid feeding. This mechanism will now be described.

The lever $h$, which is pivoted to the revoluble plate E, as heretofore described, has its inner end projecting beneath the arm $g^5$ of the pawl, and the outer end of said lever takes beneath the collar $f^3$. (See Fig. 5.) When there is no can-body clamped between the heads $c'$ and $f^2$, the spring $f^4$ presses the collar $f^3$ down on the outer end of the lever $h$, thereby throwing the inner end of said lever upward, which strikes the lower end of the arm $g^5$ and raises it, carrying the pawl $g^4$ with it and disengaging and elevating it above the ratchet-wheel $g^2$. Now although the weighted lever $g^3$ will continue to be raised and lowered by the cam as the table E revolves the wire-solder will not be fed down, because the pawl is disengaged from the ratchet-wheel. When a can-body is clamped between the heads $c'$ and $f^2$, the condition is reversed. The collar $f^3$ is then raised and the inner end of the lever $h$, the arm $g^5$, and pawl $g^4$ are all lowered and the solder is fed.

It is to be understood that the can-bodies when being soldered are clamped between the heads $c'$ and $f^2$ by the action of the spring $f^4$ and are revolved and also soldered while so clamped. When a can-body has made a complete revolution, by the turning of the table E it is discharged from between the clamping-heads and to accomplish this the upper clamping-head $f^2$ is automatically elevated from engagement with the can-body by mechanism which will now be described.

The circular plate F is secured to the shaft A' and revolves therewith, and said plate is provided with a plurality of horizontally-extending arms $i$, which are pivoted at one end $i'$ to said plate F and extend radially to the outer edge of said plate. Near the outer end each arm $i$ is provided with an elongated slot $i^2$, and the extreme outer end is provided with a roller $i^3$. A stationary curved track $j$, having inclined ends $j'$, has position at the outer edge of the plate F and extends parallel with the edge of said plate for about one-fourth of its circumference, and this track has position in the path of travel of the rollers $i^3$ of the arms $i$, so that when the plate F revolves the rollers $i^3$ will ride up on said track and elevate the free end of said arms. The vertical shafts $f'$ extend up through the plates E and F, and each shaft passes through one of the elongated slots $i^2$, and a collar $i^4$ surrounds each shaft $f'$ and has position immediately above said slot $i^2$ and rests on said arm $i$. The extreme upper end of each shaft $f'$ is provided with a pinion $j^2$, which meshes with a stationary circular rack $j^3$. As the table F is revolved the pinions $j^2$ engage the rack $j^3$ and cause the vertical shafts $f'$ and heads $f^2$ to revolve, and when the circuit has been made and the rollers $i^3$ arrive at the inclined ends $j'$ of the track $j$ the vertical shaft $f'$ and revolving head $f^2$ are elevated and the latter is freed from engagement with the can, which may then be discharged. The pinion $j^2$ on the upper end of the shaft $f'$ is also raised, but remains in engagement with the rack $j^3$ and continues to revolve.

Secured to the shaft A' at the top of the frame are brackets, which support in a substantially horizontal position a plurality of wire-solder spools $j^4$, from each of which a strand of wire-solder is fed downward through the solder-feed devices and tubes to the soldering-irons. In order to reduce the wire-solder to a molten state and distribute it on the soldering-iron $d'$ to be applied to the can-seam, I provide a suitable burner $k$, which has position beneath the iron and directs its flame against the same and also against the head $c'$. A series of pipes $k'$ radiate from the hollow shaft A' and extend in a horizontal direction and connect with a vertical pipe $k^2$, which leads to each of the burners. A second series of pipes $k^3$ radiate from the lower hollow shaft $A^2$ and also connect with the vertical pipes $k^2$. Air is supplied through the pipes $k'$ to the vertical pipes $k^2$, and gas is supplied through the pipes $k^3$ to said pipe $k^2$, the air and gas mixing in the vertical pipes and the admixture ignited at the burner. Suitable valves in each of the pipes $k'$ and $k^3$ control the flow of gas and air.

The mechanism for feeding the cans to and discharging the cans from the machine will now be described.

Secured to the shaft $A^2$ below the coupling $a$ is a star-wheel $l$, which revolves with said shaft. A lever $l'$ is pivoted to the frame of the machine and has a roller which engages the star-wheel as the latter revolves. This lever $l'$ is kept in contact with the star-wheel by means of a spiral spring $l^2$, attached to the free end of said lever. A vertical shaft $l^3$ has position at the front of the machine and carries a ratchet-wheel $l^4$ and a pawl-lever $l^5$, and the end of said pawl-lever and the end of the lever $l'$ are connected by a bar $l^6$. It will thus be seen that as the star-wheel revolves it will cause the lever $l'$, bar $l^6$, and pawl-lever $l^5$ to be reciprocated, thereby imparting an intermittent rotary motion to the vertical shaft $l^3$. The vertical shaft $l^3$ extends upwardly and passes through the bottom of a chute or canway $m$, (see Figs. 2 and 6,) and the upper end of said shaft is provided with a sprocket-wheel $m'$, around which a chain carrier $m^2$ travels. This chain carrier $m^2$ or conveyer is provided with laterally-projecting blades $m^3$, which convey the cans to be soldered and feed them onto the heads $c'$, where the can is soldered, and also convey the soldered cans away from the machine to any desirable point. The cans to be soldered traverse along one side of the canway, and the soldered cans traverse in the opposite direction along the other side of the canway.

The vertical shafts A' and $A^2$ are revolved by means of the gears $n$ and $n'$ and drive-pulley at the top of the machine, as will be readily understood.

Having thus described my invention, what I claim as new, and desire to secure by Letters Patent, is—

1. The combination of a plurality of rotary can-body clamps arranged in pairs and all of which move around a common center; a plurality of soldering-irons one being in close proximity to each pair of said clamps, and a plurality of ejector devices—one near each pair of said clamps and each of said ejectors moving in a circular path with each pair of said clamps.

2. The combination of a plurality of upper and lower rotary can-body clamps arranged in pairs and movable in a horizontal plane and parallel with the plane in which said pairs of clamps revolve, and a plurality of soldering-irons pivoted in a plane between the two clamps composing each pair and all of said irons having a movement in a horizontal plane.

3. The combination of a plurality of rotary can-body clamps all of which are movable in a direction parallel with the plane in which said clamps revolve; a soldering-iron in close proximity to each of said clamps and movable with respect to said clamps; means for applying solder to each of said irons, and a device for wiping the seam after it has been soldered.

4. The combination of a plurality of rotary can-body clamps all of which are movable in a horizontal plane; a soldering-iron in close proximity to each of said clamps, said irons being pivoted so as to accommodate themselves to contact with the circumference of the can-body to solder the end seam, and a pivoted wiper coacting with each iron whereby to contact with and wipe the seam after it has been soldered.

5. The combination of a plurality of rotary can-body clamps; a soldering-iron pivoted with respect to each of said clamps; a wiper pivoted independently with respect to both the iron and clamp, and means for feeding wire-solder to each of said irons.

6. The combination of a plurality of upper and lower rotary can-body clamps arranged in pairs and each pair moving in a horizontal plane about a common center; a plurality of soldering-irons; a plurality of wipers; and a plurality of can-body ejectors, said irons, wipers and ejectors all moving in a horizontal plane with said clamps.

7. The combination of a plurality of upper and lower rotary can-body clamps arranged in pairs; a plurality of independent soldering-irons one for each pair of said clamps; a plurality of can-body ejectors one for each pair of clamps, and a separate and distinct solder-feed mechanism for each pair of said clamps, each of said solder-feed mechanisms feeding solder only to can-bodies held between a given pair of clamps.

8. The combination of a revolving table; a plurality of rotary can-body clamps carried by and movable with said table; a soldering-iron having a support which is pivoted to and movable with said table; a wiper device also pivoted to said support, said iron and wiper both having a movement toward and away from said clamping device, and a can-body-ejector device also supported by and movable with said table.

9. The combination of a plurality of upper and lower rotary can-body clamps arranged in pairs all of which move in a horizontal plane around a common center; a plurality of independent soldering-irons, one near each pair of can-body clamps; a plurality of independent ejectors, one near each pair of clamps—said irons and ejectors also moving in a horizontal plane with each pair of clamping devices, and a stationary device for operating all of the ejectors one after the other.

10. The combination of a plurality of pairs of rotary can-body clamps each pair comprising an upper and lower head; an independent soldering-iron arranged in a plane between the upper and lower clamps of each pair; a separate and distinct solder-feed device for each pair of clamps; and separate mechanism for each pair of clamps whereby during the absence of a can-body from between any pair of clamps the solder-feed device for that particular pair of clamps will stop feeding solder.

11. The combination of an upper yielding clamping-head; wire-solder-feed device; and means operated by the movement of said yielding head whereby to stop the feed of solder during the absence of a can-body.

12. The combination of a revolving table; a lower clamping member carried on said table; means for revolving said member; an upper clamping member having a vertically-yielding movement independent of the lower member; a solder-feed mechanism, and means coacting with the yielding member whereby to cut off the feed of solder during the absence of a can-body between said clamping members.

13. The combination of a revolving table; a lower revolving clamping member carried on said table; an upper clamping member carried on a vertical shaft above said lower member, said shaft and upper member having a vertical yielding movement; a solder-feed mechanism and a cut-off device coacting between said vertical shaft and the solder-feed mechanism.

14. The combination of a revolving table; a lower revolving clamping member carried on said table; an upper clamping member carried on a vertical shaft above said lower member; solder-feed rollers; a pawl-and-ratchet device for operating said rollers to feed the solder, and a lever coacting between said pawl-and-ratchet device and said vertical shaft to disengage the pawl from said ratchet.

15. The combination of a revolving table; can-body-clamping devices carried by and movable with said table; vertically-movable shafts, one above each of said clamping devices, and each shaft carrying a head on its lower end and a collar near its upper end; a revoluble table near the upper ends of said vertical shafts and below said collars; a plurality of horizontal arms pivoted at their inner ends to said table and their outer ends each carrying a roller, and a trackway over which said rollers run whereby to elevate said horizontal arms and vertical shafts.

16. The combination of a plurality of rotary can-body clamps arranged in pairs; a separate and independent soldering-iron near each pair of clamps; and a separate and independent solder-feed mechanism near each pair of said clamps, all of said pairs of clamps, soldering-irons and solder-feed mechanisms movable in the same plane and around a common center.

In testimony whereof I affix my signature in the presence of two witnesses.

CHARLES H. AYARS.

Witnesses:
 LOREN P. PLEMMER,
 WALTER P. BALLINGER.